United States Patent [19]
Nakazawa et al.

[11] Patent Number: 5,578,670
[45] Date of Patent: Nov. 26, 1996

[54] MAGNETIC POWDER FOR BONDED MAGNETS, COMPOSITION FOR BONDED MAGNETS AND METHOD FOR PREPARING THE COMPOSITION

[75] Inventors: Kazuma Nakazawa, Kodaira; Munehiko Kato, Yokohama; Toshikazu Shinogaya, Kodaira, all of Japan

[73] Assignee: Bridgestone Corporation, Tokyo, Japan

[21] Appl. No.: 443,330

[22] Filed: May 17, 1995

[30] Foreign Application Priority Data

May 19, 1994 [JP] Japan .................................. 6-129606
Jul. 12, 1994 [JP] Japan .................................. 6-182890

[51] Int. Cl.$^6$ .............................. C08K 3/10; C04B 35/26
[52] U.S. Cl. ...................... 524/435; 524/436; 252/62.54; 252/62.56; 252/62.63
[58] Field of Search ........................... 252/62.54, 62.56, 252/62.63; 524/435, 436

[56] References Cited

U.S. PATENT DOCUMENTS

| | | | |
|---|---|---|---|
| 4,230,787 | 10/1980 | Watanabe | 252/62.54 |
| 4,434,063 | 2/1984 | Kageyama et al. | 252/62.63 |
| 4,448,870 | 5/1984 | Imai et al. | 252/62.54 |
| 4,529,680 | 7/1985 | Asanae et al. | 252/62.54 |
| 4,543,312 | 9/1985 | Murakawa et al. | 252/62.54 |
| 4,619,777 | 10/1986 | Melzer et al. | 252/62.54 |
| 4,622,281 | 11/1986 | Imai et al. | 252/62.54 |
| 4,935,325 | 6/1990 | Kuribayashi et al. | 252/62.56 |
| 5,354,638 | 10/1994 | Harada | 252/62.54 |

*Primary Examiner*—Peter A. Szekely
*Attorney, Agent, or Firm*—Sughrue, Mion, Zinn, Macpeak & Seas

[57] ABSTRACT

A magnetic powder for bonded magnets is obtained by subjecting starting magnetic particles to agitation in a high speed air stream whereby individual particles are mechanically impacted with one another by the action of the stream. A magnetic composition comprising the magnetic powder and a resin binder is also described wherein the magnetic powder can be highly packed in the resin binder to ensure good fluidity of the composition. The magnetic composition can be prepared by mixing magnetic particles and a resin binder powder, subjecting the mixture to agitation in a high speed air stream for impactness of the particles and heading the mixture or by subjecting magnetic particles to agitation in a high speed air stream, mixing the agitated particles with a powder of a resin binder and heading the resultant mixture.

11 Claims, 1 Drawing Sheet

MAGNETIC POWDER FOR BONDED MAGNETS, COMPOSITION FOR BONDED MAGNETS AND METHOD FOR PREPARING THE COMPOSITION

BACKGROUND OF THE INVENTION

1. Field of the Invention

This invention relates to a magnetic powder for bonded magnets which is ready for injection molding when highly packed or filled, and also to a composition for bonded magnets and a method for preparing such a composition as mentioned above.

2. Description of the Related Art

As is known in the art, bonded magnets have been usually obtained by a procedure which comprises mixing a magnetic powder, such as a ferrite, with a binder such as nylons (polyamides), PPS (polyphenylene sulfide) or the like at an appropriate mixing ratio to obtain a mixture, kneading the thus obtained mixture by means of a kneader such as a KCK kneader, a biaxial extruder or the like, and subjecting the resultant bonded magnet composition in the form of pellets to injection extrusion molding. In order to have the bonded magnet imparted with a high magnetic force, attempts have been made to provide a bonded magnet composition wherein a magnetic powder is highly packed in a binder. In prior techniques, when a magnetic powder is highly packed, the resultant composition is undesirably lower in fluidity. If such a highly packed composition whose fluidity is lower is subjected to injection molding, there arises the problem that the molding machine may suffer clogging in the barrel thereof or the composition may not be injected in the mold, thereby making the molding impossible. Thus, some limitation has been placed on the high packing of a magnetic powder in the bonded magnet composition, i.e. on the formation of a bonded magnet whose magnetic force is high.

SUMMARY OF THE INVENTION

It is an object of the invention to provide a magnetic powder for bonded magnets which can be readily injection molded under highly packed conditions and is thus able to provide a bonded magnet with a high magnetic force.

It is another object of the invention to provide a magnetic composition for bonded magnets which comprises the magnetic powder of the type mentioned above.

It is a further object of the invention to provide a method for making the magnetic powder set forth above.

According to one embodiment of the invention, there is provided a magnetic powder for bonded magnets which is obtained by subjecting starting magnetic particles to agitation in a high speed air stream whereby individual particles are mechanically impacted with one another by the action of the stream.

The magnetic powder should preferably be agitated until a spatula angle is not higher than 75°.

According to another embodiment of the invention, there is also provided a magnetic composition for bonded magnets which comprises 88 to 25% by volume of a magnetic powder which is impacted by agitation in a high speed air stream and, correspondingly, from 12 to 75% by volume of a resin binder.

According to a further embodiment of the invention, there is provided a method for preparing a composition for bonded magnets which comprises agitating a mixed powder of a magnetic powder and a resin binder powder in a high speed air stream so that individual particles of the mixed powder are impacted with one another, and subjecting the resultant mixture to kneading under melting conditions of the resin binder powder.

According to a still further embodiment of the invention, there is provided a method for preparing a composition for bonded magnets which comprises agitating a magnetic powder in a high speed air stream so that individual particles of the magnetic powder are impacted with one another, mixing the thus agitated magnetic powder with a resin binder powder, and kneading the resultant mixture under melting conditions of the resin binder powder.

The magnetic powder which is obtained by agitating and impacting the powder in a high speed air stream ensures good fluidity when highly packed in a resin binder and permits easy injection molding. The reason for this is not clearly understood at the present stage of our investigations. Presumably, this is because when a starting magnetic powder is agitated in a high speed air stream and mechanically impacted, coagulations of the magnetic powder are disintegrated into finer pieces and the crystals; of the powder are removed at sharp edges thereof and shaped into a more spherical form, resulting in a melt mixture having a higher fluidity. Thus, according to the invention, a melt mixture having a magnetic powder, such as a ferrite powder, highly packed therein ensures high fluidity. More particularly, a melt mixture wherein a ferrite powder has been highly packed and which has never been injection molded in prior art can be moldable using the magnetic powder of the invention. As a consequence, a high magnetic force injection molded product is obtained.

PREFERRED EMBODIMENTS OF THE INVENTION

Figure 1:
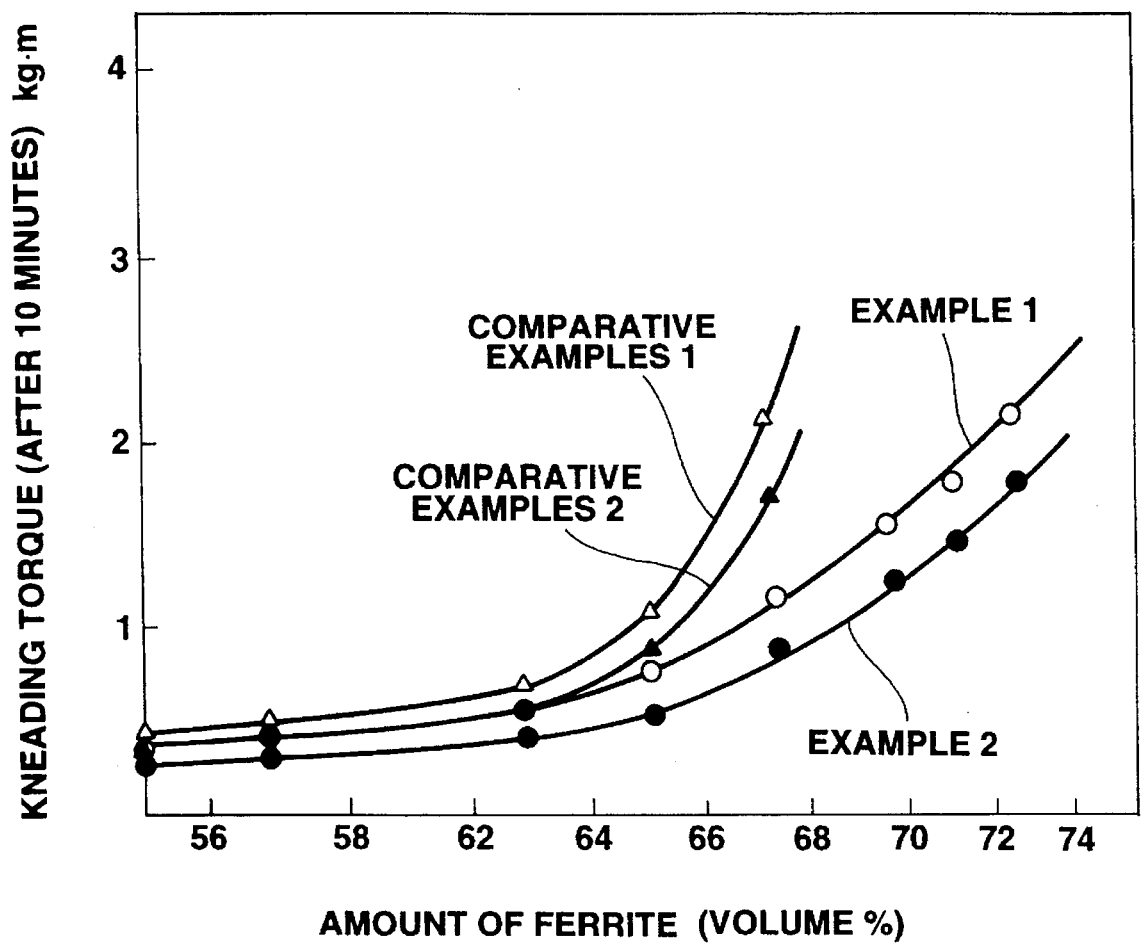
FIG. 1 is a graph showing the relation between the amount of strontium ferrite and the kneading torque in Example 1 and Comparative Example 1.

The magnetic powder of bonded magnets according to invention is first described. The magnetic powder is one which is obtained by agitating the powder in a high speed air stream whereby the individual particles of the powder are mutually collided and impacted with one anther.

The magnetic powder may be made of any magnetic materials ordinarily used for the bonded magnets. Such magnetic materials include, for example, ferrites such as barium ferrite, strontium ferrite and the like.

The final magnetic powder should preferably have an average particle size of from 0.05 to 100 µm, more preferably from 0.1 to 10 µm.

Preferably, the magnetic powder should be treated with a coupling agent on the surfaces thereof. Examples of the coupling agent include silanes, titanates and the like known in the art. The treatment with the coupling agent may be effected prior to or after the impactness through agitation in a high speed air stream.

Where the magnetic powder is subjected to agitation in a high speed air stream to impact on itself, it is preferred that the agitation is continued until the resultant powder has a spatula angle not higher than 75°. The treatment of the magnetic powder in a high speed air stream may be effected after milling, for example, in a ferrite preparation process.

The procedure of agitating a starting magnetic powder in a high speed air stream to mechanically impact individual particles with one another may be, for example, one wherein the particles are treated according to a hybridization system using a circulating high speed air stream impacting method. In this case, the speed of the high speed air stream should preferably be in the range of 20 to 150 m/seconds, more preferably not less than 50 m/seconds. The treating time is preferably in the range of from 30 seconds to 30 minutes, more preferably from 1 to 15 minutes.

The starting magnetic powder may be treated in a jet mill wherein the particles are impacted thereon using a high speed air stream. In this case, the speed of the stream is preferably in the range of from 50 to 500 m/seconds, more preferably from 100 to 400 m/seconds.

The composition for bonded magnets according to the invention should comprise a magnetic powder impacted by agitation in a high speed air stream in a manner set out hereinabove and a resin binder.

Examples of the binder include not only thermoplastic resins such as nylon 6, polypropylene, polyethylene, polystyrene, polyethylene terephthalate (PET), polybutylene terephthalate (PBT), polyphenylene sulfide (PPS), ethylene-vinyl acetate copolymer (EVA), ethylene-ethyl acrylate copolymer (EEA), ethylene-vinyl alcohol (EvOH) and the like, but also thermosetting resin, thermoplastic elastomers, rubbers and the like. Moreover, those resins obtained by alloying the resins set out as ordinarily used for the fabrication of bonded magnets may also be used. Where a mixed powder of a magnetic material and a resin binder are used for impactness where a mixed powder of a magnetic material and a binder is impacted through agitation in a high speed air stream, the binder used in the form of a powder should preferably have an average size of from 0.1 μm to 10 mm, more preferably from 1 μm to 1 mm.

The mixing ratio between the magnetic powder and the binder is such that the mixture comprises 88 to 25% by volume of the magnetic powder and, correspondingly 12 to 75% by volume of the binder, more preferably 88 to 38% by volume of the magnetic powder and 12 to 62% by volume of the binder, and most preferably 81 to 41% by volume of the magnetic powder and 19 to 59% by volume of the binder.

The magnetic powder used in the composition of the invention should be impacted through agitation in a high speed air stream. For this purpose, the magnetic powder may be impacted either in the form of a mixed powder of a starting magnetic powder and a binder at such a mixing ratio as defined above, or may be impacted singly without combination with any resin binder, after which the resultant magnetic powder is mixed with a resin binder.

According to a method for fabricating a composition for bonded magnets, a mixed powder of a magnetic powder and a binder is agitated in a high speed air stream to mechanically impact individual particles therewith and kneaded under melting conditions of the binder. Alternatively, a starting magnetic powder may be singly agitated in a high speed air stream to impact individual particles therewith, then mixed with a resin binder, and kneaded under melting conditions of the binder. The mixing of the magnetic powder and the binder can be carried out by any ordinary procedure under ordinary conditions using, for example a Henschel mixer. The melt kneading can be effected, for example, by use of a biaxial kneader extruder, a KCK kneader extruder or the like according to ordinary procedures and conditions which depend on the melting conditions of the resin binder.

After the melt kneading, the mixture may be shaped into pellets for subsequent procedures.

The thus obtained melt kneaded product (i.e. composition for bonded magnets) exhibits high fluidity, from which a bonded magnet of a desired form can be obtained such as by injection molding. The injection molding conditions are those ordinarily used for this purpose.

As will be apparent from the foregoing, the magnetic powder for bonded magnets according to the invention has high flowability by itself and the composition using such a magnetic powder exhibits high fluidity, permitting a composition formulated with not less than 67% by volume of a magnetic powder such as of a ferrite to be readily injection molded, unlike prior art techniques. By this, a magnetic force level higher by 10 to 15% than in prior art cases can be achieved.

The present invention is more particularly described by way of examples and comparative examples. It should be construed that the invention is not limited to those examples.

EXAMPLES 1, 2

A strontium ferrite powder (spatula angle of 77°) which had been surface treated with a silane coupling agent and had an average particle size of 1 μm and a powder of a nylon 6 resin having an average particle size of 50 μm or a powder of a polyethylene phthalate (PET) powder having an average particle size of 100 μm were mixed for 5 minutes in a Henschel mixer at different mixing ratios indicated in FIG. 1. The resultant powder mixtures were each treated according to a high speed air impact method using a hybnotizer made by Nara Machine Co., Ltd. at a stream speed of 100 m/second for 5 minutes.

The resultant powder mixture which had been impacted through agitation in the high speed air stream was subjected to kneading in Laboplasto Mill (Toyo Seiki Co., Ltd.) at 300° C. for the nylon and at 290° C. for the PET, thereby assessing the fluidity thereof. The fluidity was assessed as a torque value at the time when the torque exerted on the composition being kneaded was made stationary. The results are shown in FIG. 1.

The kneaded products of the powder mixtures at different amounts of strontium ferrite shown in Table. 1 were each pelletized, followed by injection molding in a magnetic field with a received magnetic field of 3 KOe to obtain a molding, followed by assessment of a magnetic force thereof. The results are shown in Table 1. The injection molding was effected at a cylinder temperature of from 270° to 300° C. for the nylon and at a cylinder tempers. ture of 260° to 290° C. for the PET.

Comparative Examples 1, 2

The general procedure of Examples 1, 2 was repeated except that the powder mixtures obtained after the mixing in the Henschel mixer were kneaded without agitation in the high speed air flow stream, thereby assessing the fluidity. The results are shown in FIG. 1.

In the same manner as in Examples 1, 2, the magnets were made and evaluated with the results shown in Table 1.

TABLE 1

|  | Amount of Ferrite (% by Volume) | 58.3 | 62.6 | 67.2 | 70.0 | 72.4 |
|---|---|---|---|---|---|---|
| Magnetic Force (G) | Example 1 (Nylon) Comparative | 2620 | 2802 | 3005 | 3123 | 3250 |

TABLE 1-continued

| Amount of Ferrite (% by Volume) | 58.3 | 62.6 | 67.2 | 70.0 | 72.4 |
|---|---|---|---|---|---|
| Example 1 (Nylon) | 2610 | 2790 | — | — | — |
| Example 2 (PET) | 2608 | 2806 | 3003 | 3125 | 3240 |
| Comparative Example 2 (PET) | 2612 | 2788 | — | — | — |

The results of FIG. 1 reveal that the kneading torque exerted on the kneading mixtures treated according to the high speed air stream impact method is lower by 50% in maximum than the kneading torque of the kneading mixtures of the comparative examples. Thus, the fluidity is significantly improved. In the comparative examples, when the ferrite is formulated in amounts not less than 67% by volume, the kneading in the Laboplasto Mill was not possible. When using the powders of the examples subjected to the high speed air stream impact method, compositions formulated with 72% by volume of the ferrite can be readily kneaded. This means that a high level of fluidization is possible when the ferrite powder is subjected to the high speed air stream impact method.

On the other hand, the results of Table 1 demonstrates that the injection molding is possible for the compositions of the examples comprising 72% by volume of the ferrite powder, whereas the injection molding is possible only at 62% by volume of the ferrite powder formulated in the comparative examples. In the examples, a magnetic force as high as 3250 G was achieved at a ferrite content of 72% by volume. In the comparative examples, a magnetic force at a ferrite content of 58% by volume was as low as 2610 G. From this, it has been revealed that a high level of magnetization wherein a magnetic force increases by 25% over that of prior art can be achieved by the high speed air flow agitation.

EXAMPLE 3

The general procedure of Example 1 was repeated except that a single track jet mill (made by Seishin Kigyou Co., Ltd.) was used in place of the Hybnodizer and the powder was treated at a pneumatic pressure of 7 kg/cm$^2$ and at an air stream speed of 230 m/second, thereby obtaining a kneaded product. The fluidity of the product was assessed.

EXAMPLES 4, 5

The general procedures of Examples 1 and 3 were, respectively repeated except that a strontium ferrite powder alone was used for impact through agitation in a high speed air stream and then mixed with a nylon resin powder in a Henschel mixer, thereby obtaining kneaded products. The fluidity of the products was evaluated.

For all the examples and comparative examples, a kneading torque of the compositions formulated with 64.9% by volume of the ferrite was measured. The results are shown in Table 2 below.

TABLE 2

| | Examples (Nylon) | | | | Comp. Ex. (Nylon) | Example (PET) | Comp. Ex. (PET) |
|---|---|---|---|---|---|---|---|
| | 1 | 3 | 4 | 5 | 1 | 2 | 2 |
| Kneading Torque Value (kg.m) | 0.75 | 0.78 | 0.80 | 0.80 | 1.20 | 0.63 | 1.00 |

In Examples 1 and 3, the strontium ferrite powders which had been impacted by agitation in the high speed air stream were each subjected to measurement of a spatula angle by use of a powder tester PT-N (made by Hosokawa Micron Co., Ltd.), with the results of an angle of 69° for both cases. On the other hand, the ferrite powder not subjected to agitation in the high speed air stream had a spatula angle of 77°, revealing that the flowability of the ferrite powder of the invention was significantly improved.

What is claimed is:

1. A magnetic composition for bonded magnets comprising 88 to about 65% by volume of a magnetic powder impacted by agitation in a high speed air stream and from 12 to about 35% by volume of a resin binder wherein said high speed air stream has a speed of from 20 to 150 m/second when employing a hybridization system using a circulating high speed air impact method or a speed of from 50 to 500 m/second when using a jet mill.

2. A magnetic composition according to claim 1, wherein said starting particles are made of a ferrite.

3. A magnetic composition according to claim 1, wherein said magnetic powder has an average size of from 0.05 to 100 μm.

4. A magnetic composition according to claim 1, wherein said magnetic powder comprises a magnetic powder treated with a coupling agent on the surfaces thereof prior to or after the agitation in the high speed air stream.

5. A magnetic composition according to claim 1, wherein said magnetic powder comprises a magnetic powder with a spatula angle of not less than 75°.

6. A method for preparing a magnetic composition for bonded magnets comprising the steps of agitating 88 to about 65% by volume of a mixed powder of magnetic particles and 12 to about 35% by volume of a resin binder powder in a high speed air stream so that individual particles of the mixed powder impact one another, and kneading the resultant mixture under conditions where the resin binder powder is melted wherein said high speed air stream has a speed of from 20 to 150 m/second when employing a hybridization system using a circulating high speed air impact method or a speed of from 50 to 500 m/second when using a jet mill.

7. A method according to claim 6, wherein said magnetic powder has an average size of from 0.05 to 100 μm and said resin binder powder has an average size of from 0.1 μm to 10 mm.

8. A method according to claim 6, wherein a mixing ratio between said magnetic powder and said resin binder powder is such that said magnetic powder is present in an amount of 88 to 25% by volume and said resin binder powder is correspondingly present in an amount of 12 to 75% by volume.

9. A method for preparing a composition for bonded magnets comprising the steps of agitating a magnetic powder in a high speed air stream so that individual particles of the magnetic powder impact one another, mixing 88 to about 65% by volume of the thus agitated magnetic powder with 12 to about 35% by volume of a resin binder powder, and kneading the resultant mixture under conditions where the resin binder powder is melted and wherein said high speed air stream has a speed of from 20 to 150 m/second when employing a hybridization system using a circulating high speed air impact method or a speed of from 50 to 500 m/second when using a jet mill.

10. A method according to claim 9, wherein said magnetic powder has an average size of from 0.05 to 100 µm and said resin binder powder has an average size of from 0.1 µm to 10 mm.

11. A method according to claim 9, wherein a mixing ratio between said magnetic powder and said resin binder powder is such that said magnetic powder is present in an amount of 88 to 25% by volume and said resin binder powder is correspondingly present in an amount of 12 to 75% by volume.

* * * * *